Figure 1:
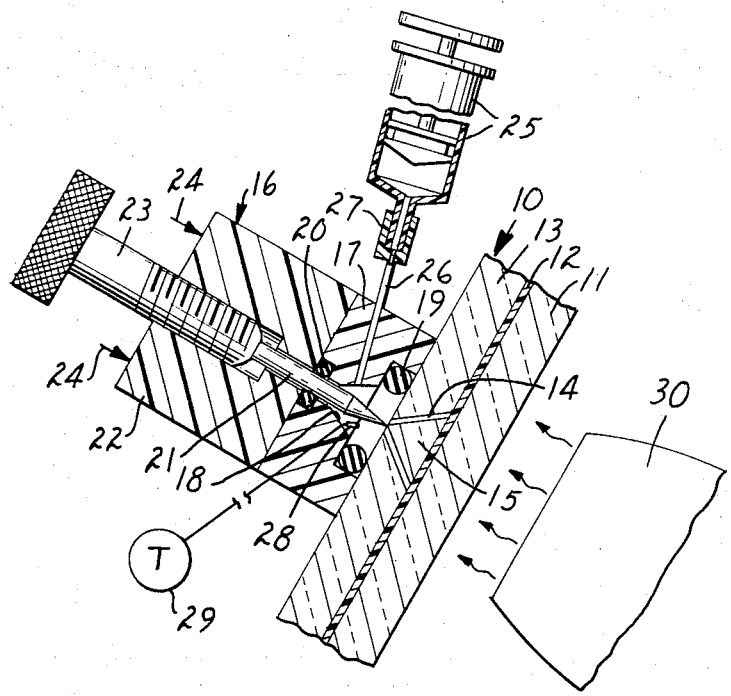

United States Patent [19]
Hollingsworth

[11] 3,765,975
[45] Oct. 16, 1973

[54] WINDSHIELD REPAIR
[75] Inventor: Gordon P. Hollingsworth, White Bear Lake, Minn.
[73] Assignee: Minnesota Mining and Manufacturing Company, St. Paul, Minn.
[22] Filed: Dec. 17, 1971
[21] Appl. No.: 209,092

[52] U.S. Cl. .................. 156/94, 117/2, 264/102
[51] Int. Cl. ................................. B32b 35/00
[58] Field of Search ............... 156/94; 117/2; 264/23, 102

[56] References Cited
UNITED STATES PATENTS
3,562,366  2/1971  Sohl ........................... 264/23
3,663,148  5/1972  Walker et al. ............ 264/102 X
2,040,126  5/1936  Grieve ...................... 144/309

Primary Examiner—Edward G. Whitby
Attorney—Alexander, Sell, Steldt & Delahunt

[57] ABSTRACT

In-place permanent repair of pockmarked windshields involves vibrationless application of curable liquid resin under defined conditions of temperature and pressure.

3 Claims, 2 Drawing Figures

Patented Oct. 16, 1973

3,765,975

INVENTOR
GORDON P. HOLLINGSWORTH
BY Kinney, Alexander,
Sell, Steldt & DeLaHunt
ATTORNEYS

WINDSHIELD REPAIR

This invention relates to the in-place repairing of pockmarked safety-glass automotive windshields.

Pockmarks in windshields, such as are caused by impact with rocks and the like, are a frequent cause of distress to drivers of automobiles; and the replacement of windshields due to such marks places a heavy burden on insurance companies.

A procedure for the in-place repair of pockmarked windshields has been described in U.S. Pat. No. 3,562,366. The method involves pressing the loose cone of glass remaining within the conical pockmark away from the surface opening, applying liquid transparent polymerizable resin to the opening, and then subjecting the area to supersonic vibration together with artificial cooling to overcome the extreme heating affect of the vibrator. Under the influence of the vibratory energy, the resin penetrates and completely fills the very narrow space between cavity walls and cone, displacing the air contained therein. The resin is then caused to harden and the surface is smoothed and polished into conformity with the surrounding surface of the windshield. The repair is found to be substantialy indistinguishable from the remainder of the windshield.

It has now been found possible to obtain equally effective repair of pockmarked windshields without the use of high frequency vibration and hence with less complicated and far less expensive apparatus requiring no high frequency power supply and no artificial cooling. The entire operation is simplified and made more economical, while still providing substantially undetectable repairs which are fully equivalent to those obtained by the prior art method.

Except for the absence of the vibratory mechanism, the apparatus employed is similar to that of the prior art. It comprises a cup-shaped body held tightly over the pockmark area and fitted with a movable pointed probe and a removable syringe. The body is most conveniently held in place by a supporting frame attached to the windshield by rubber suction cups. Temperature measuring means is included. Where repair operations are to be conducted under sub-normal ambient temperatures, a source of heat is found necessary; and heating to higher temperatures, e.g up to about 180° F., is sometimes found desirable. For such purposes a small hot air blower, such for example as a domestic hair dryer, is found to be particularly convenient although other heating means may be used.

Unlike the prior art method, the method of the present invention involves the application of both negative and positive static pressures to the resin at the pockmark area. Pressures are applied through the syringe plunger and may be generated by hand or mechanically. In the case of garage-based operations a convenient source of high positive pressure may be the customary air pressure line connected to a suitable hydraulic cylinder the piston of which is attached to the plunger of the syringe.

Figure 2:
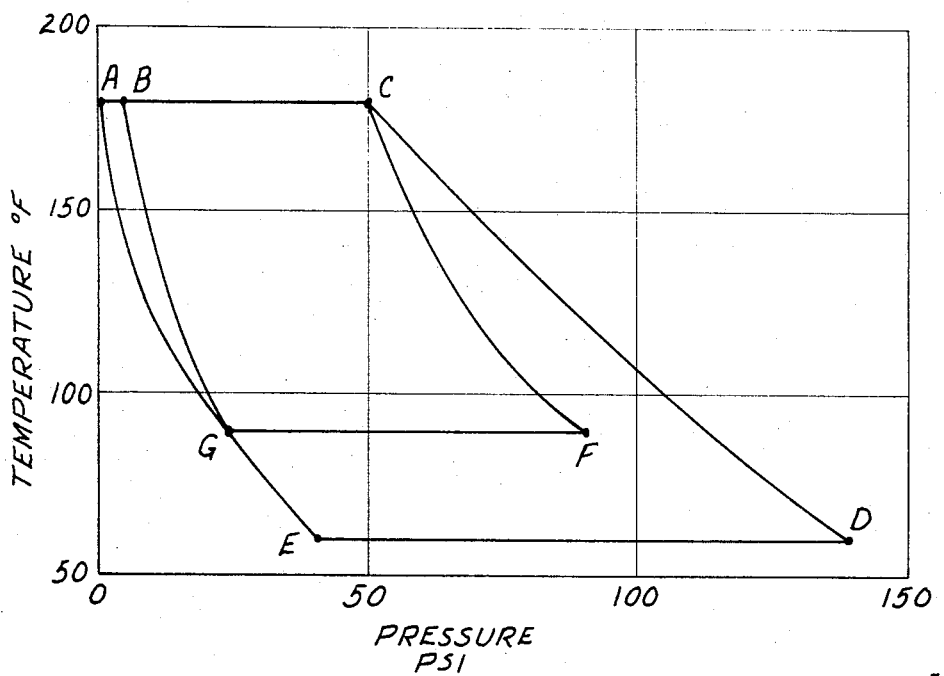

In the drawing,

FIG. 1 is a schematic representation, largely in section, of repair apparatus applied to a pockmarked safety-glass windshield, and FIG. 2 is a graphical representation showing the relationship of temperature and pressure in completing a repair with the apparatus of FIG. 1.

Referring to FIG. 1, the windshield 10 to be repaired comprises an inner glass panel 11, central plastic film 12, and outer glass panel 13, the latter having a conical open-tipped cavity 14 containing a conical glass segment 15 as found in nearly all pockmarked safety-glass windshields.

The repair apparatus comprises a block 16 which is preferably made of hard transparent plastic and in two parts for convenience in cleaning. A lower member 17 has an axial opening enlarged at one end to form a small generally conical cavity 18 and carries an outer O-ring 19 forming a seal with the windshield surface and an inner O-ring 20 forming a seal with a central pointed probe 21. An upper member 22 has an axial opening which receives the probe 21 and is tapped to accept a threaded screw 23. The assembly is held firmly together and against the windshield by force applied, as indicated by arrows 24, from a framework held in position on the windshield by rubber suction cups or other means, not shown.

Liquid resin is supplied to the cavity 18 from a syringe 25 through a hollow needle 26 embedded in the member 17, the tip of the syringe fitting within an enlarged head 27 in known manner to provide a pressure-resistant coupling. A thermocouple junction 28 is positioned closely adjacent the tip of the probe 21; the leads, embedded in the member 17, are connected to a suitable meter 29. Alternatively but less effectively, temperature indicating crystals or strips may be inserted between members 17 and 22.

Heating is accomplished, where required, by a current of warm air supplied from a heater 30 supported near the surface of the windshield opposite the pockmark.

Since the windshield is normally exposed to the weather for a significant time after the break occurs and before repair is undertaken, it is usually necessary to clean and dry the area before adding the resin. Operations such as scraping with a sharp blade, brushing with a stiff bristle brush, wiping with a cloth slightly moistened with toluene, methylethyl ketone, or other suitable volatile solvent, and heating under vacuum may be relied upon to provide adequate cleanliness and dryness. The apparatus of FIG. 1, or a simplified version thereof employing a simple cup-shaped chamber and attached syringe or suction line, is useful for heating under vacuum.

In a preferred sequence of operations, the pockmark is first carefully relieved of any visible chips of glass by probing, scraping and brushing. The area is then wiped with methylethyl ketone, and the apparatus is clamped in place, the point of the probe being placed against the exposed tip of the cone 15. Gentle heat is supplied from the reverse surface while a vacuum is maintained within the cavity 18 by evacuation through the needle 26 either by means of the empty syringe or by connection to the vacuum pump used for the suction cups which support the apparatus against the windshield.

After a time sufficient to remove all traces of solvent and moisture, the syringe is partially filled with liquid resin, freed of air, and connected to the head 27. The plunger is then retracted, placing the cavity and pockmark area under partial vacuum and permitting escape of a portion of the air from the cavity through the needle. The resin flows toward the cavity and is assisted by moving the plunger forwardly. After sufficient resin has entered the cavity to cover the open tip of the pockmark, the plunger is again retracted, permitting further amounts of air to escape. The sequence of pressure and vaccum is repeated for a number of cycles, each requiring at least several seconds and with gradually increasing pressure, until on evacuation no further bubbles of air can be observed at the pockmark. The probe 21 is next forced against the tip of the cone 15, by rotation of the screw 23, at least until some visible indication of movement of the cone occurs. Frequently this takes the form of moving colored interference rings within the area; at times some indication of release of air bubbles or filling of voids may appear, such bubbles or voids being visible in the form of dark specks or dots as viewed from the rear surface and under oblique illumination. It is found that such indications generally occur at probe pressures corresponding to at least about four or five lbs. dead weight, although much higher pressures may be used if desired. Pressure of the probe 21 on the cone is maintained while additional vacuum and pressure cycles are carried out, again until repeated cycling produces no further evidence of bubbles. The apparatus is removed and the area is subjected to conditions causing curing of the resin to the solid state. Excess resin is then removed by scraping or filing and the surface is polished into conformity with the surrounding surface areas of the windshield.

The preliminary vacuum and pressure cycling is helpful in achieving rapid removal of air and penetration of resin but is not essential, since equally good results are obtained by initially applying probe pressure to the glass cone 15 and then maintaining such pressue during subsequent application of resin and of vacuum and pressure.

It is frequently found desirable to apply a thin coating of a finishing resin over the pockmark area prior to complete cure of the polymerizable filing resin. The finishing resin when similarly cured will have somewhat improved hardness and abrasion resistance, and will additionally fill in any slight depressions left in the area upon removal of the block 16 or introduced during preliminary partial curing.

Many permanently liquid oily materials are capable of providing temporary improvement in the appearance of a pockmark area, and, particularly when applied by methods just described, may result in temporary elimination of all visual evidence of voids. However these materials have a tendency, during exposure in use, to flow, volatilize, exude, or be washed from the repair area and to collect dirt and dust, and accordingly the resultant repair cannot be considered permanent.

An excellent filling resin formulation consists of 70 parts by weight of unsaturated polyester resin containing 25 percent methyl methacrylate (Paraplex P-44-4-A), to which is added 30 parts of methyl methacrylate, 0.5 parts of gammamethacryloxypropyltrimethoxysilane ("Silane A-174") and 0.4 parts of benzoin. The mixture has a viscosity of 100 cps at room temperature (75°F). It adheres strongly to glass and cures rapidly, under exposure to ultraviolet, to a hard clear resin having substantially the refractive index of windshield glass. It may be stored in absence of light.

A presently preferred finishing resin formulation is similar but contains 80 instead of 70 parts of the polyester resin mixture, and 20 parts of styrene in place of the 30 parts of methyl methacrylate. The viscosity is 250 cps. at 75° C and the cured resin is harder and more abrasion resistant than the filling resin. The finishing resin may be used also as a filling resin but will require higher temperature or pressure, or longer time, for complete filling of voids. Conversely, other resin formulations having lesser viscosities will be found to provide complete filling under less drastic conditions but may show a tendency to flow from the repair area during preliminary stages of cure.

Using the above-identified filling resin, excellent results have been obtained at a temperature of 120° F, a probe pressure of about ten lbs., a vacuum of about −10 pounds per square inch, and a maximum pressure of about 40 psi, and maintaining both vacuum and pressure under static conditions for about 15 seconds each during each cycle. Longer holding periods are advantageous at lower temperatures and lower pressures; conversely, at higher levels the periods may be significantly shortened. Vacuum of as much as 12 psi (ie about 3 psi absolute pressure) has been attained with apparatus as described in connection with FIG. 1 using a cavity 18 measuring about 9 mm. in diameter and 9 mm. in height, and a 3 ml. syringe having an inner diameter of 9 mm. and initially containing 0.5 ml. of liquid resin. With the same equipment, pressures of several psi are easily attained by hand, and pressures up to at least 125 or 135 psi may be achieved by other methods hereinbefore indicated.

Substantially complete elimination of visible discontinuities has been achieved by the methods of the present invention under operating conditions of about 3 to about 135 psi maximum positive pressure and about 60° to about 180° F when further held within the limits of area ACDE or preferably the more restricted area BCFG indicated in the graph of FIG. 2. In all instances a vacuum of at least about 5 psi (absolute pressure about 10 psi) and preferably at least about 10 psi is also required; and the pressure differential thus established must be at least about 10 psi.

What is claimed is as follows:

1. The method of repairing a pockmarked safety-glass windshield having a close-fitting conical glass segment within an open-tip conical cavity in the outer glass panel, without subjecting the pockmark area to supersonic vibration; said method consisting essentially of: supplying at the clean pockmarked area a quantity of liquid polymerizable resin composition, subjecting said conical glass segment to probe pressure sufficient to cause visible evidence of movement thereof relative to said cavity, and subjecting said area to alternate negative and positive pressures over a pressure differential range of at least about 10 psi with maximum pressure not exceeding about 135 psi, while maintaining said area at between about 60° F. and about 180° F., for a number of cycles sufficient to cause the disappearance in said pockmarked area of all visible evidence of voids, and wherein said maximum positive pressure and said temperatures are further defined as lying within the area ACDE of the graph of FIG. 2; exposing said composition in said pockmark area to conditions causing curing thereof to a solid state; and smoothing and polishing the repaired area into conformity with surrounding areas of said windshield.

2. Method of claim 1 wherein said temperature and said maximum pressure are held within the area BCFG of said graph.

3. Method of claim 1 including the step of applying a surface coating of transparent liquid polymerizable resin composition over the filled pockmark area prior to complete curing of said filler resin and then continuing the cure, and wherein the composition of said surface coating is formulated to provide a cured product of substantially greater hardness than the cured product of said filler resin composition.

* * * * *